Jan. 7, 1969  E. R. SANDHAGE ET AL  3,420,743
HARVESTING BIOLOGICALS FROM EGGS
Filed March 14, 1966  Sheet 5 of 8

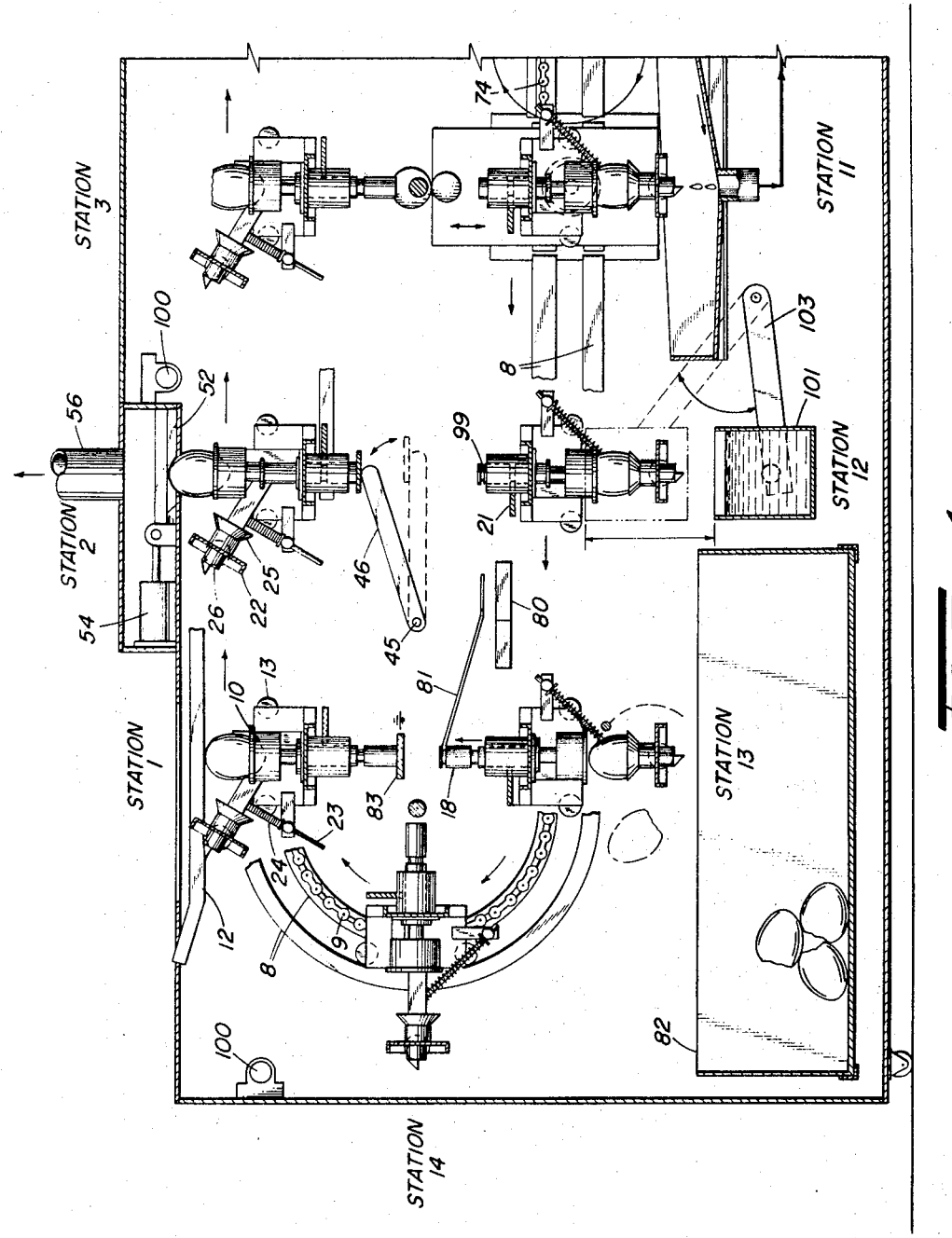

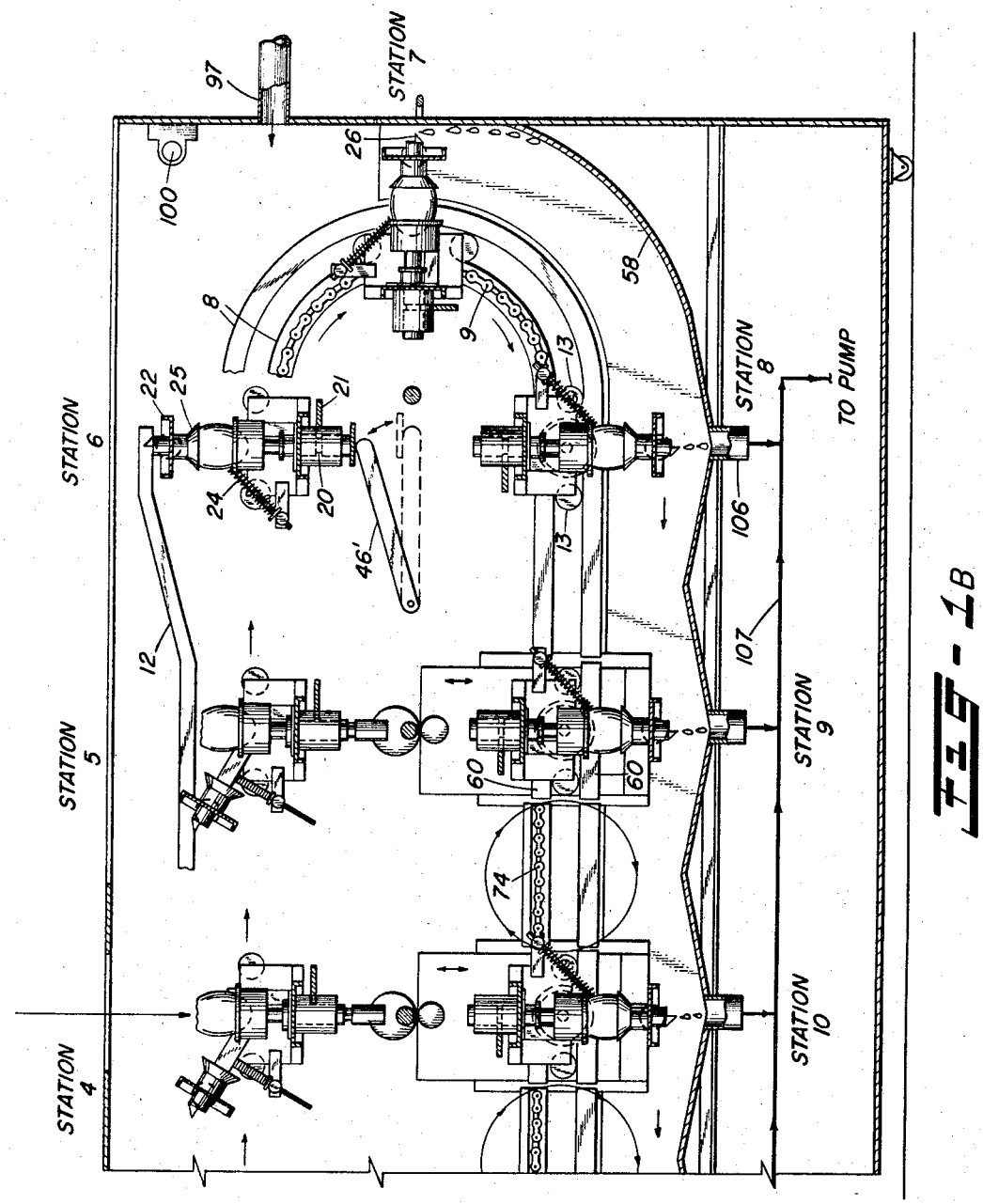

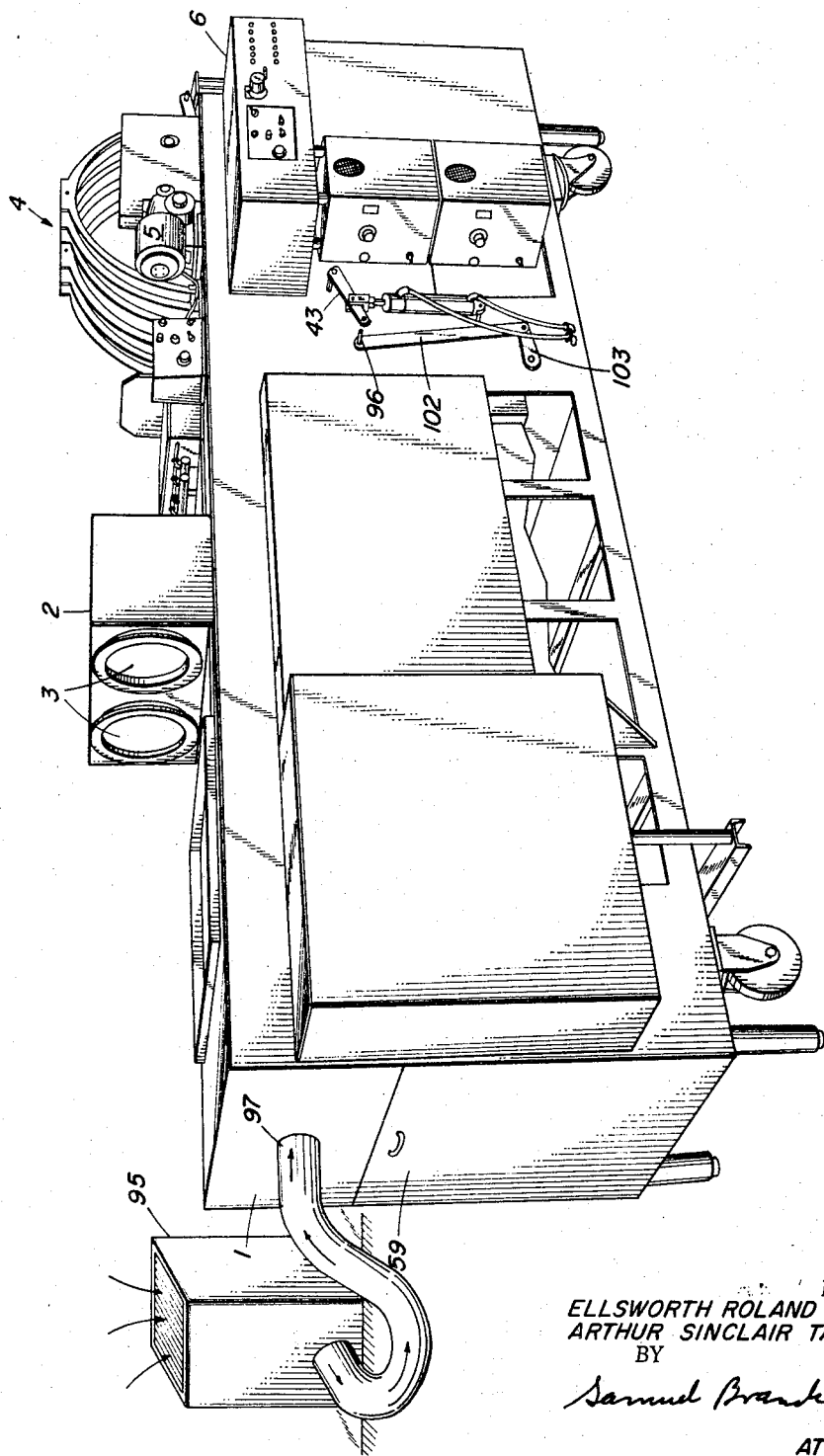

STATION 2

INVENTORS.
ELLSWORTH ROLAND SANDHAGE
ARTHUR SINCLAIR TAYLOR
BY

ATTORNEY

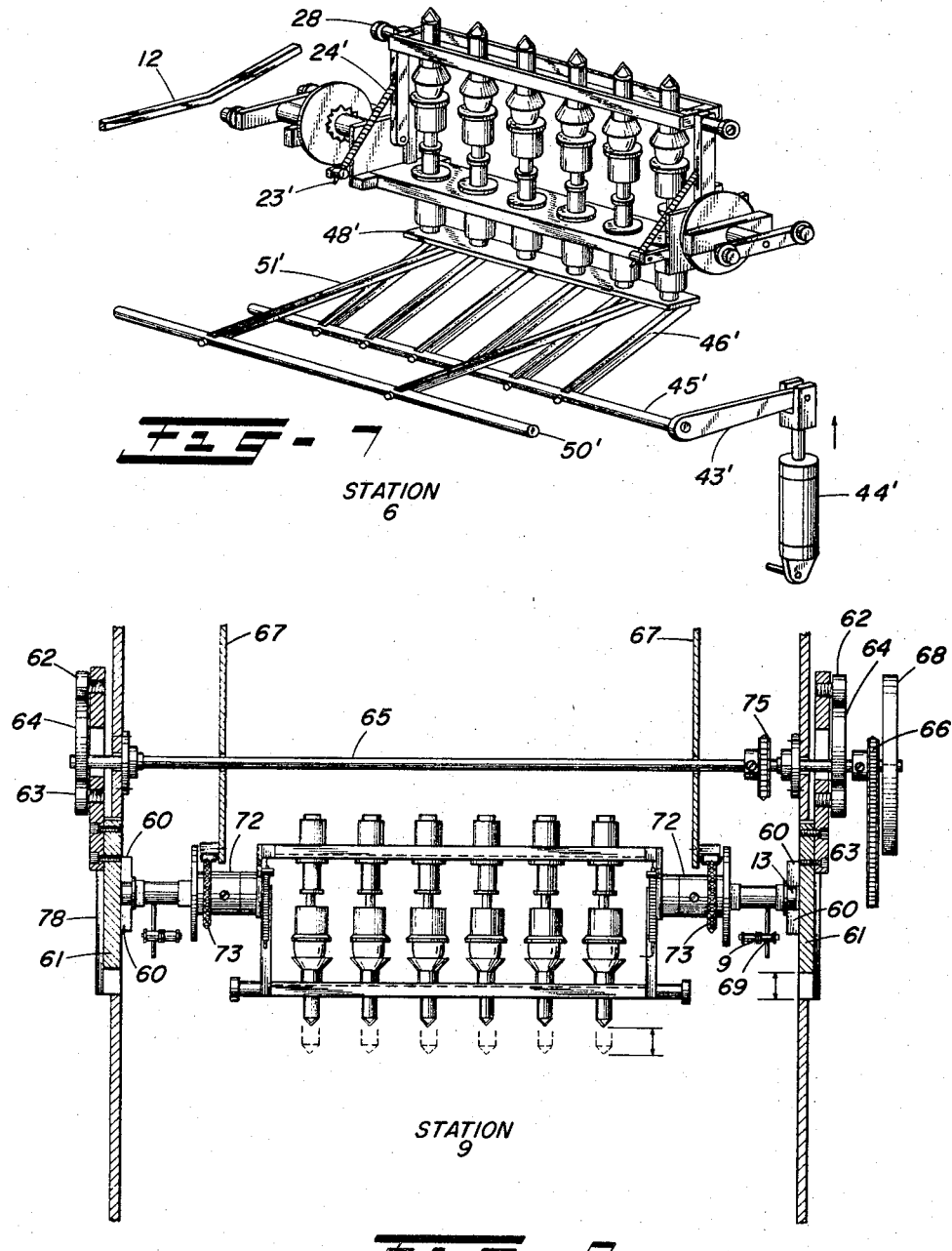

BETWEEN STATIONS 9 & 10

United States Patent Office

3,420,743
Patented Jan. 7, 1969

3,420,743
HARVESTING BIOLOGICALS FROM EGGS
Ellsworth Roland Sandhage, Pearl River, and Arthur Sinclair Taylor, Spring Valley, N.Y., assignors to American Cyanamid Company, Stamford, Conn., a corporation of Maine
Filed Mar. 14, 1966, Ser. No. 533,898
U.S. Cl. 195—104      11 Claims
Int. Cl. C12k 5/00; C12d 7/00; A61k 23/00

This invention relates to an improved machine for harvesting vaccines or similar biologicals from parts of embryonated eggs which have been inoculated with various biologicals, such as virus and the like. More particularly, the invention is concerned with a machine for harvesting vaccines from the amniotic fluid or chorioallantoic fluid from the embryonated eggs.

The use of embryonated eggs for culturing various biologicals has grown to a very large operation using many thousands or thousands of dozens of eggs per week. Typical practical uses of the machine of the present invention is in the production of vaccines for mumps, bronchitis, or human flu, and the machine is also useful for harvesting bacterial cultures from embryonated eggs, such as leptospira.

Ordinarily, clear fluids, either amniotic, chorioallantoic, or both, after incubation in eggs where the biological, such as vaccine or virus, has been introduced into the fluids through a small drilled hole is effected by breaking or decapitating the rounded end of the egg, puncturing the particular membrane, and removing the fluid. It has also been proposed to introduce into the proper place a tube and aspirating the fluids. The methods hitherto used, as described above, have a number of very practical drawbacks in spite of which they have been standard in the industry. The first drawback is the very great amount of manual labor required, which with the enormous number of eggs handled in a week constitutes a greatly increased cost.

A second drawback is the problem of rapid harvesting while maintaining sterile conditions, that is to say conditions which do not introduce foreign micro-organisms or viruses other than those which were deliberately introduced in the culturing procedure. The substantially sterile conditions of great reduction in possibility of introduction of unwanted pathogenic micro-organisms is mandatory in many biological products, such as vaccines. In machines and methods used hitherto it has been extremely difficult to prevent unwanted micro-organisms from contaminating the biological products, and there remained a demand for equipment which can be maintained sterile or substantially sterile during operation.

A third problem is the difficulty of preventing tissue, such as bits of yolk and the like, from being harvested, which results in cloudy liquids which are less desirable but which in many cases per force have been tolerated. A fourth drawback is that the prior methods, particularly where a tube is introduced for aspiration, often result in damage to the embryo, which produces bleeding and thus contaminates the liquids harvested with blood. This again has been tolerated but is not desirable.

The present invention is directed to a machine which greatly reduces the labor involved in harvesting, permits maintaining sterile, or substantially sterile, conditions, produces clear fluids, and also produces a maximum of harvested fluid, which in turn is an important factor in reducing cost. The present invention, which involves a multistation automatic machine, uses elements at some of the stations which are in themselves not unknown, for example, as will be described below, one of the operations involves decapitating the end of an egg, and this mechanism is not a completely new thing. The machine also involves some new mechanisms at certain stations, and it should be realized, therefore, that the invention is a combination invention involving both old and new elements combined together to produce a unitary and improved result.

Egg breaking machines, normally used for breaking unfertilized eggs and separating yolks and albumen or in some cases for recovering albumen alone, have been described in the past. Typical illustrations can be found in U.S. Patents 3,137,330 and 3,147,783. These patents are in no sense the only egg breaking machines but are typical of the best types of machines which have been developed so far. These machines are not capable of harvesting clear fluids from embryonated eggs because they are designed to separate yolks from albumen and so are not suited to the harvesting of clear fluids from embryonated eggs which have been inoculated with viruses, vaccines and the like. Except, therefore, as an indication that the broad idea of breaking eggs by machinery is not a new thing, these prior art patents do not show any machine having the organization capable of handling the particular problem of the present invention. The prior art machines of course do not encounter the problem of sterility or substantial sterility and require only ordinary clean conditions.

The present invention makes possible the maintenance of sterile or substantially sterile conditions. Thus the machine may be sprayed with liquid disinfectant at the end of each run, using, of course, a disinfectant which is compatible with the virus in the harvested fluids, for example 1 part in 10,000 of merthiolate or 1 part in 4,000 of formalin, which are suitable for vaccines for mumps, human flu, and the like, an important field of use for the present invention. In the case of some other biologicals, different disinfectants may be required where the ones mentioned are not completely compatible with the virus present.

Another provision which is readily incorporated in the machines of the present invention is pressurizing with filtered air during the operation of the machine, and preferably also when it is standing overnight. Sterilizing lamps can also be provided in the machine, and in the preferred embodiment of the invention which will be described, periodic treatment with disinfectant of the portions of the machines coming in contact with the biologicals is made possible several times during the actual harvesting.

While not, strictly speaking, a part of the machine of the present invention but involved in a preferred process for using the machine, the shells of the eggs are sterilized before entering the machine by wiping or washing the cooled eggs in disinfectant and then drying.

The above typical precautions for providing sterile or substantially sterile environments are of course enhanced by providing the room in which the machine is operated with suitable sterilization means, which is common practice in pharmaceutical companies. Strictly speaking, this is not part of the actual machine, but it should of course be used under accepted precautions which are normally employed in dealing with biologicals.

In addition to the sterilization during normal operation and at the end of the day's run, which has been referred to above, a very thorough washing of the machine with disinfectant, such as formalin, is normally indicated when changing from the harvesting of one biological to another. It is an advantage of the invention that such treatments are readily carried out.

The principles of the present invention will be described somewhat generally, followed by a description of a specific machine which is the best mode of carrying out the invention. In general the machines of the present invention involve egg holding elements with associated attachments which are moved mechanically from station to station by intermittently moving conveying means. In the preferred machine which will be described below an endless conveyor chain is used in which the egg holding elements are first on the top and then on the bottom. However, it is equally possible to provide machines which move egg holding elements from station to station horizontally. Such horizontal machines involve some further mechanical complications and while included in the broadest aspects of the present invention do not constitute the preferred form.

Considering now the machine of the present invention as one which moves egg holding elements from one station to another, the general organization will be described. In the first station the egg holding elements, which may for example be a 6-egg tray, are loaded, manually or by other means. The egg holding elements then move to further stations in which the eggs are decapitated at their rounded ends by knife mechanisms which in themselves are not new things. The decapitated shell is removed, for example by vacuum, which is also not by itself a new operation. The egg holder then moves to another station where human operators, usually two, one on each side of the holding element, puncture the desired membranes of the egg, either the amniotic membrane or the chlorioallantoic membrane or both if both fluids are to be recovered at the same time. Sterility, in the sense set out above, can be maintained by having the whole operation after egg loading proceed under germicidal ultraviolet radiation and with suitable hand sleeves for the two operators at the station where the membranes are punctured.

After puncturing of the membranes the egg holder moves on and a funnel, preferably of yieldable material, is swung into place covering the decapitated end of the egg and having a sufficiently small tubular bore to prevent passage of any pieces of tissue. The egg holders then, with each egg capped with a funnel or similar element, is then turned either by passing around one end of the endless chain of the preferred method or by other suitable mechanisms in the case of horizontal table indexing machines, and the desired fluid flows out into suitable containers. After this preliminary gravity drainage the egg holders and with them the eggs are shaken longitudinally, which produces further outflow of liquid.

After shaking, the egg holders are reversed, which permits air to enter the eggs and break any vacuum. At further stations the egg holders are then once again inverted, further fluid draining out, and they are again shaken. The egg holders then travel to a station where the eggs are withdrawn and discarded and finally the conveyor moves around to the initial station, where another set of eggs are loaded into the egg holder. The cycle of drainage, shaking, turning to break vacuum and again inverting and shaking may be repeated more than once, but in production machines a single repetition is usually sufficient for harvesting most products. The invention of course is not limited thereto.

Clear liquid is harvested with a very greatly reduced amount of labor. The yield of clear liquid from each egg is kept at a maximum. A typical example of the low labor cost is shown by the fact that three operators can handle 10,000 eggs per day. Under the operating procedures formerly used, as described above, it would take seven operators to handle the same number of eggs. Also, as has been pointed out above, improved quality of fluid is obtained. It is clear, and with reasonable precautions, for example by cooling the eggs to from 2° C. to 20° C., preferably below 10° C., before introducing into the machine, contamination by blood from the embryo is eliminated or reduced to a negligible minimum. As has been mentioned above, the eggs are also preferably sterilized by washing with cold disinfectant.

The invention will be described in more detail in conjunction with the drawings, in which:

FIGS. 1A and 1B are a semidiagrammatic side elevation partly in section of the whole machine;

FIG. 2 is an isometric view, partly broken away, of the whole machine;

FIG. 7 is a diagrammatic isometric view of the egg holders at Station #6 after funnel attachment to the eggs;

FIG. 8 is a section through Station #9;

Figure 3:
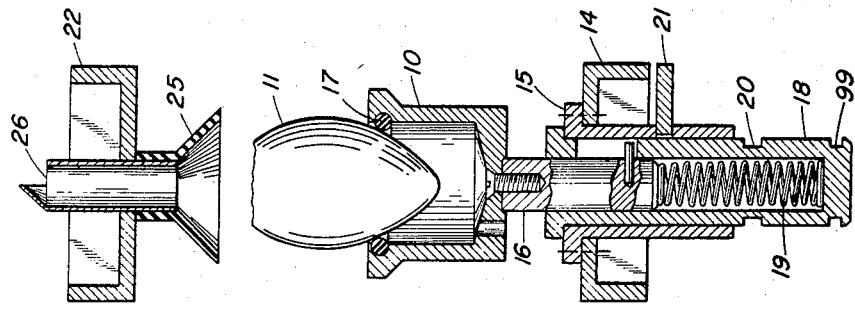
FIG. 3 is an enlarged section of an egg holder showing a decapitated egg and funnel, but being diagrammatic and not showing associated driving mechanisms.

FIG. 2 shows the machine as a whole with a housing, piercing station cover 2 with operator rubber sleeves 3. Also shown are the curved tracks 4 at the loading or first station, with drive motor 5, and the electrical controls shown at 6. These electrical controls, which are generally referred to as "the brain," are of standard designs and their exact structure is therefore not illustrated, as if forms no part of the present invention. However, the type of the brain is the well known programming devices in which a series of discs with appropriate notches, one disc for each station, are mounted on a shaft which is clutched into a constantly turning motor. The brain functions when the egg holders are indexed at their particular stations, the different discs with associated switches programming the proper sequence of operation at the particular station which a disc controls.

The brain operates when an egg holder is indexed at a station, which of course indexes all of the holders at the different stations since they are attached to the same conveyor chain. On reaching the station, the movement of the conveyor chain is stopped and the brain is clutched in to program the sequence of operations at each of the different stations. In a practical commercial machine the cycle of the brain discs is slightly under 15 seconds. After completing the programs, the brain unclutches itself from its drive motor and switches in the motor driving the conveyor chain, which then moves one station and shuts itself off by conventional micro-switches, and the brain goes through its cycle again. The brain itself is of a standard type, which except for the large number of discs and larger number of electrical switches and circuits is of the same general type as is used in other electrical appliances, such as dishwashers, automatic washing machines, and the like. The cycle of course is much shorter and the number of switches which program different operations at different stations is, of course, much larger. The conventional notched disc and switch type of programmer is preferred, but the invention is not in any sense limited to any particular design of programmer so long as it causes the particular sequence of operations at the particular stations.

FIG. 2 also illustrates diagrammatically a means 95 for producing filtered air under pressure, the air being forced through a duct and into opening 97 in the end wall of the machine.

It will be noted that the view of FIGURE 2 is from the back of the machine, and therefore right and left are reversed with respect to FIGS. 1A and 1B. The remainder of the description of the drawings will follow the sequence of operations shown on FIGS. 1A and 1B, referring to other detailed figures where appropriate.

The machine as a whole is provided with an oval track 8 on which egg holders 10, which are illustrated as holding six eggs, although in many views, including FIGS. 1A and 1B, only one egg shows, roll along the track on rollers 13. For clarity in FIGS. 1A and 1B most of the track is shown broken away in order not to obscure the various stations. Drive for the egg holders 10 is by means of an endless chain 9 which is moved intermittently by sprockets (not shown). Various sterilizing ultraviolet lamps 100 are illustrated for maintaining substantially sterile conditions.

FIG. 3 illustrates some of the details of an egg holder, there being a framework 14 which extends across the six egg holders proper and is provided with flanged sleeves 15 for each holder in which cups 18 fit with a spring 19. Each egg holder is provided with a rod 16 which slides in the cup 18 and is urged upwardly by the spring 19. The cup 18 is provided with a locking groove 20 in which a locking bar 21 moves when the cup is slid up in the sleeve 15, as will be described below. The cup is also provided near its extreme end with an additional groove 99, the function of which will be described below in connection with Stations 12 and 13. The holder 10 is provided with a soft rubber ring 17 which engages the small end of the eggs 11.

Figure 5:
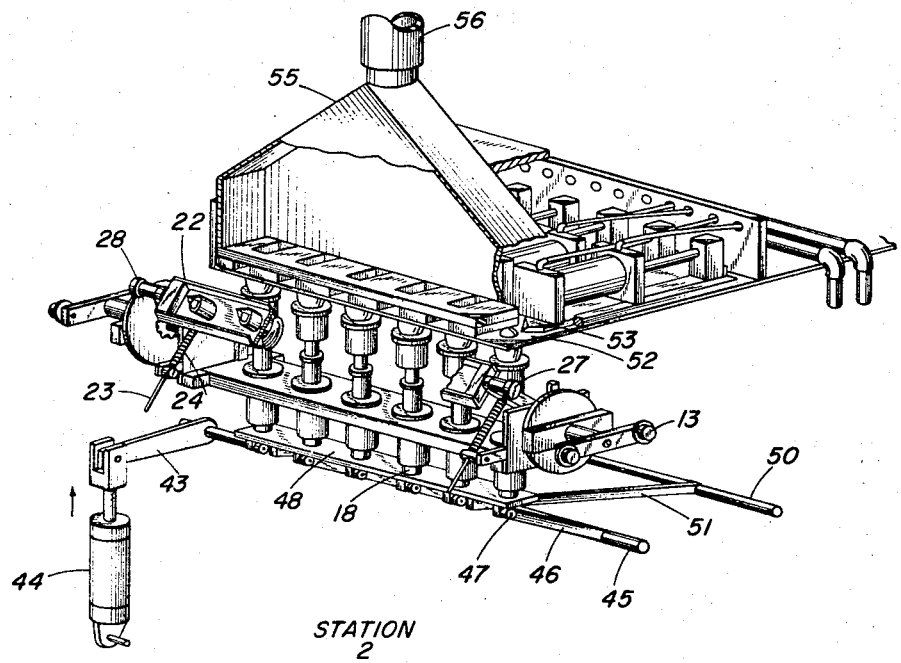
FIG. 5 is an isometric view, partly broken away, of the egg decapitating station.

A framework 22 carrying funnels 25 with spouts 26 is capable of swinging on arms 27 under the pressure of compressed springs 24 which surround guide rods 23. This is shown in FIG. 5 for the second station. The same framework and springs and rods are also shown in FIGS. 1A and 1B and FIG. 3. The arms 27 are provided with rollers 28 (FIG. 5), which for Stations 1 to 6 contact the cam track 12, which is shown in FIGS. 1A and 1B, and extends across the top of the machine, although in the drawings most of the cam track is shown broken away to avoid obscuring other mechanisms and only the portions which are operating functionally are illustrated.

As the egg holders move to Station 1, the rollers 28 engage the cam track 12 and are forced by it to move the funnel supporting framework 22 down and hence swinging it over to the left, the funnels therefore being moved to one side of the egg holders where the eggs are to be loaded. This movement compresses the springs 24 which surround the rods 23. The egg holders, therefore, in Station 1 are open from the top and loading is effected as illustrated more particularly in FIG. 4.

Figure 4:
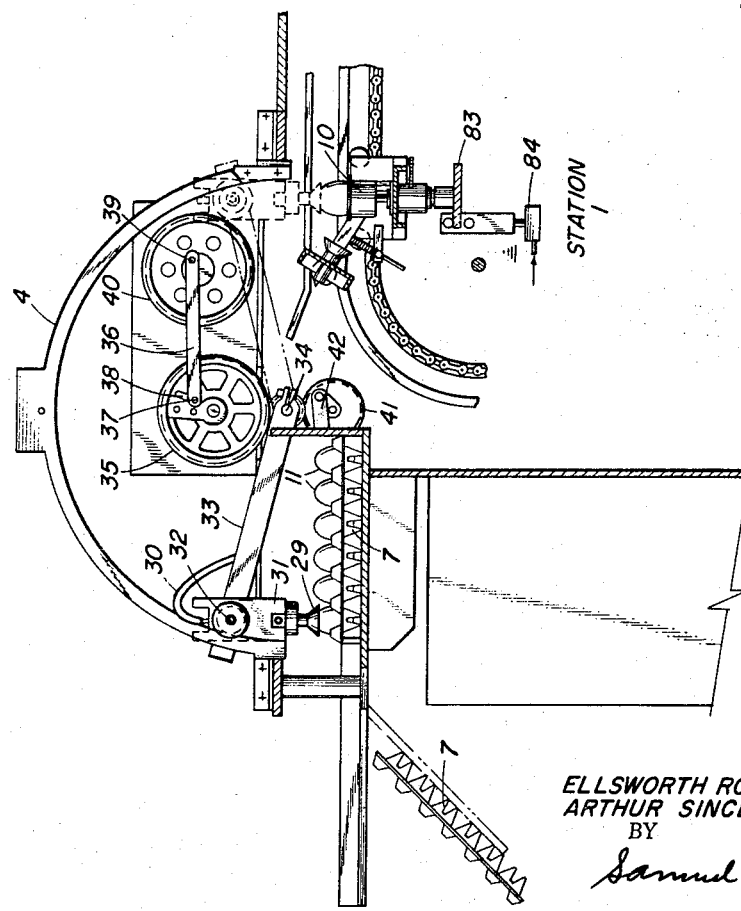
FIG. 4 is a section through the egg loading station.

Eggs arrive in crate 7 in which the eggs are numbered 11. The crate is moved gradually to the left in the figure, engaging successive rows of six eggs each with vacuum funnels 29 supplied with vacuum from the flexible lines 30. This causes the rounded end of each of the six eggs to be sucked tightly into the funnels 29, and now the funnel heads 31, through which a shaft 32 extends from two side frames 33 attached to a shaft 34, are turned, the heads 31 rolling along the loading tracks 4 to a position shown in dashed lines at the right of FIG. 4. The tracks are close together at the left, 1.85″, and diverge to a spacing of 2.5″ at right. This separates the eggs which are almost touching in the crate. Drive for the shaft 34 is by the gear 35 which is oscillated through a predetermined arc by pin 37 operating in a slot 38. The pin is in the end of a connecting arm 36 which in turn is journaled on a pin 39 in the main loading drive gear 40, which rotates continuously in the same direction. The movement of the funnel heads 31 to the right hand position causes the eggs held by them to be deposited in the egg holders 10 in the same vertical position which is shown at the right of FIG. 4. Vacuum is now broken on command of the brain, and as the gear 40 continues to turn, the funnel heads 31 roll back along the tracks 4 to their initial position. While this occurs, a slow turning gear 41 with an arm 42 moves the egg trays back one row so that the funnels 29 now close on the next row of eggs in readiness to load the next egg holder when it moves to Station 1.

After moving the egg crate 7 over six rows, as is illustrated with crates holding thirty-six eggs, a new full crate is fed in manually or automatically, and on subsequent movements to the left, finally the empty egg crate 7 is removed by sliding down a chute, as is shown at the left in FIG. 4. It will be noted that the egg holder is in a lowered position as compared to the position at Station 2, which will be described in connection with FIG. 1A. When the eggs are released from the funnels 29 it is possible that some of them may not be completely upright. This is prevented by a vibrating plate 83, actuated by the vibrator 84, which vibrates the egg holder so that the eggs settle into perfectly vertical positions. The timing by the appropriate disc in the brain performs the above functions in sequence, and so of course the movement of the funnels, which deposit the eggs in the egg holders, occurs through a shorter time than the standard 15 second cycle; and the vibration of the egg holders, which lasts for a very short time, of the order of a second or so, is completed before the brain initiates the next indexing movement of the main conveyor chain.

When the egg holders move to Station 2, an arm 43 (FIG. 5), is raised by a hydraulic cylinder 44. This arm turns a shaft 45 on which fingers 46, bearing rollers 47, move up. These rollers bear on a plate 48 which contacts the lower ends of the cups 18 (FIG. 3), causing them to rise, but the locking bar 21 is held out of engagement with the grooves 20 by a cam which will be described later in connection with FIG. 10. At this point of the machine, the egg holders are held in their raised position only for so long as the arms 46 are also in their raised position. A lateral alignment of the arms 46 and the plate 48 is assured by the arms 51 turning on the shaft 50 (FIG. 5).

Figure 9:
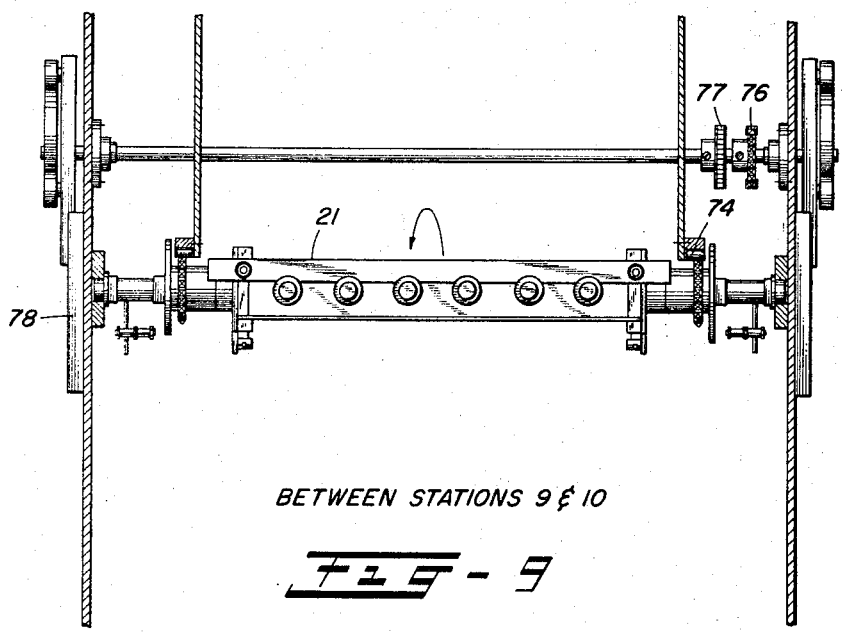
FIG. 9 is a section between Stations 9 and 10 showing the egg holder partly turned.
Figure 10:
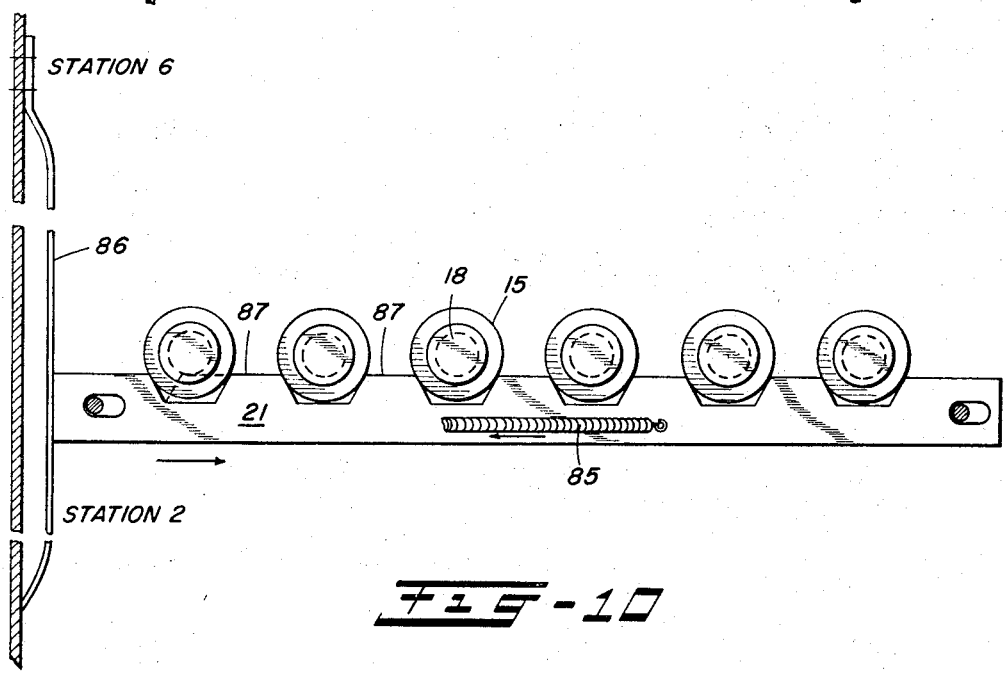
FIG. 10 is an enlarged detail of the egg holder locking bar and actuating cam.

During the raising of the egg holders, as described above, and for some subsequent stations, it is necessary that the holders be not locked. FIG. 10 shows the locking mechanism and should be read in conjunction with FIG. 9 which shows the relative position of the locking bar 21. This bar has a series of notches with projections 87 and is normally urged to the left by the spring 85. When it moves to the left, the projections 87 slide into the grooves 20, which grooves can be seen on FIGURES 1A and 1B and FIGURE 3. However, in this station and for several succeeding stations, it is not desired to lock the egg holders in any particular vertical position, and therefore the locking bars 21 of each egg holder are urged to the right by the cam 86, which is fixed to the machine. This positions the notches in the bar opposite the egg holder shafts and the latter are not locked.

In the raised position of the egg holders, as can be seen in FIGS. 1A and 5, the rounded or blunt ends of the eggs are caused to protrude through openings in a plate 52. Now, knives 53 are moved forward by hydraulic cylinders 54, thus decapitating the eggs. Vacuum in the hood 55 now removes egg shells, which are ejected through the conduit 56 to a waste bin (not shown). The knives 53 then retract, and the cylinder 44 moves the arm 43 into its lower position, thus lowering the egg holders, which then move on to Station 4 (FIG. 1B), through Station 3. Operators with their hands through the rubber sleeves 3 (FIG. 2), then pierce either or both membranes, depending on whether it is desired to harvest both amniotic fluid and chorioallantoic fluid or only one of them. As this operation is not done automatically by the machine, it is diagrammatically shown on FIG. 1B as an arrow, in order to avoid confusion of the drawings through illustration of the operator's hands.

The egg holder now moves on through Station 5 to Station 6. As will be seen, the rollers 28 move along the cam track 12, and where it rises to Station 6 the funnels 25 and their framework 22 swing over the eggs. FIG. 3 shows the position when the funnels 25 have been swung over the eggs by the pressure of the springs 24. At Station 6 there is a mechanism which is the mirror image of that shown in FIG. 5. This is illustrated in FIG. 7, and as the function performed in raising the egg holders is the same as in FIG. 5, the elements will be given the same reference numbers but primed. Thus the fingers 46' can be seen on FIG. 1B to raise up the egg holders and press the eggs firmly against the funnel 25. Differences in egg length are taken up by the spring 19, which not only permits adjustment for the eggs of different lengths but provides a resilient mounting preventing accidental cracking of the decapitated eggs. Although, as described above, the raising of the egg holders is the same as in FIG. 5, there is one difference. In FIG. 5 the locking bar 21 is kept in its right hand position as shown in FIG. 10, and therefore the projections 87 do not slide into the grooves 20. As a result, after decapitation, when the fingers 46 are lowered, the egg holders lower also to the position shown at Station 3. At Station 6, however, the profile of the cam 86 changes and permits the locking bar to be pulled to the left by the spring 85 thus locking the egg holders, a position in which they remain for most of the succeeding stations until reaching Station 13, which will be described in due course below. In the locked position the eggs are firmly, but gently, pressed against the funnels 25 so that when inverted liquid flows out through the funnels and does not leak out around them. This is to avoid liquid coming into contact with the egg shell.

As the chain 9 moves the egg holders on, they begin to turn at the right hand end of the track, and liquid begins to drop out of the spouts 26. This is shown at Station 7 on FIG. 1B, the liquid dropping into a trough 58 which forms a liquid container that can accumulate liquid and periodically be withdrawn as it is part of the drawer 59 which is shown in FIG. 2.

When the holder reaches Station 8, the flow of liquid is at a maximum and the egg holder then goes to Station 9, where there is an important modification of the track 8. The track no longer continues as a solid piece, but there is a short separated portion 60 which is capable of moving up and down as the egg holders are shaken, shown by the double arrow at the station. The shaking mechanism is illustrated in FIG. 8. At this view is a section looking along the track, that is to say at right angles to the section of FIG. 1B, both front and back sections of the track show. They both bear the same reference numeral 60.

The track section 60 is mounted on two shaker plates 61 to each of which are attached rollers 62 and 63 bearing on cams 64, which in turn are mounted on shaft 65, driving by a chain and sprocket 66 from an electric motor (not shown), controlled by its disc and switches in the brain. When the egg holder is precisely aligned in Station 9, the shaft 65 begins to turn, and the plates 61 and with them the track sections 60 and the egg holder are violently shaken through the small distance shown by the double arrow. As there are two cam followers constituting a desmodromic drive, the plates 61 are positively moved up and down. Baffle plates 67 keep drive lubricants from getting into the zone through which the egg holders move and thus aid in preventing any compromising of sterility in this zone. Shaft 65 also carries a locking cam 68 with a notch and locking lever (not shown), controlled by the brain. When the predetermined number of vibrations of the plates 61 have been completed, the cam 68 turns until the notch causes locking of the shaft 65. This is at a point where the portion of the tracks 60 are in exact alignment with the main track 68 and therefore permit the holders now to move on to the next station.

Figure 11:
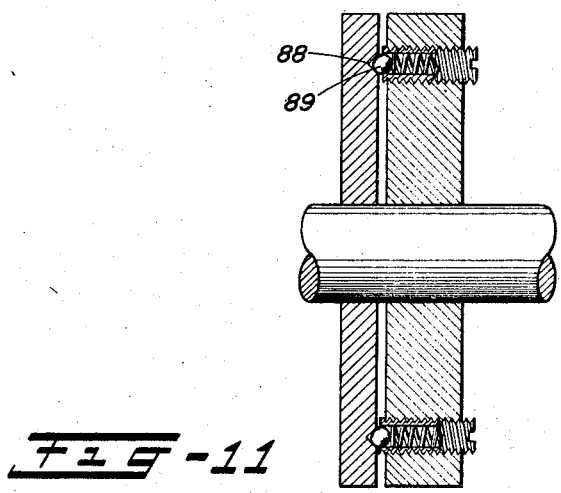
FIG. 11 is a detail of detents for holding the egg holders in a vertical position.
Figure 12:
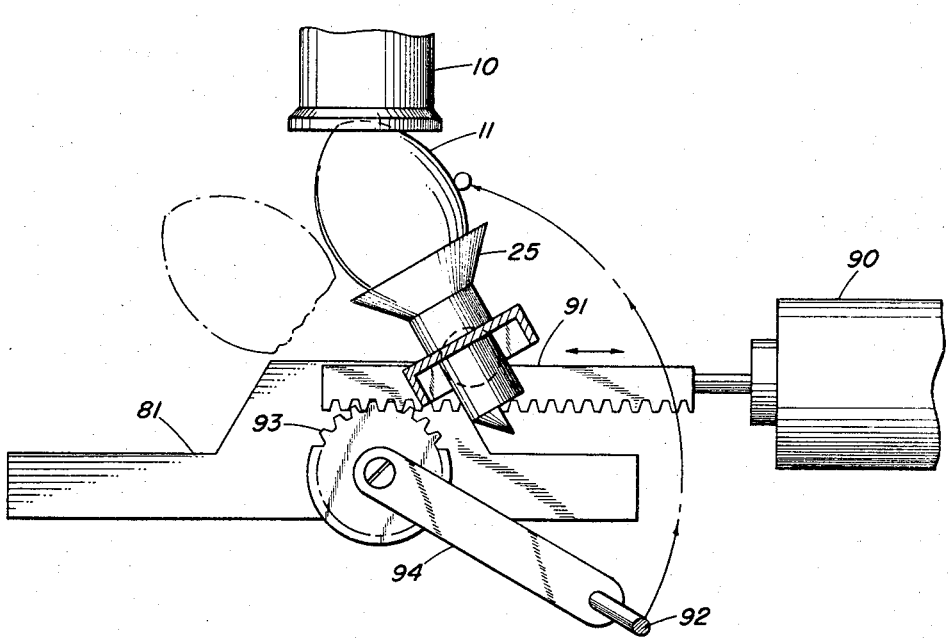
FIG. 12 is a detail view of the spent egg discharging mechanism.

As it is essential that the egg holders be maintained vertical during shaking, this is provided by the notches 88 with spring pressed balls 89 shown in FIG. 11.

Figure 6:
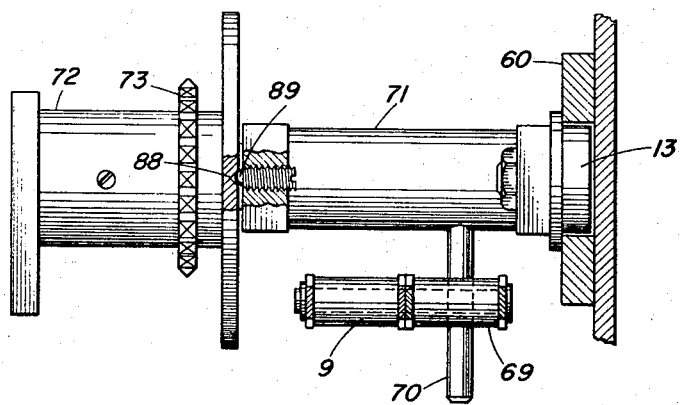
FIG. 6 is a detailed section, on an enlarged scale, of a portion of the egg holder showing conveyor drive.

FIG. 8 and the enlarged detail FIG. 6 also illustrate the connection between the egg holders and the chain 9. This is by pins 70 which extend from sleeve 71 in which the shaft on which the rollers 13 are mounted turns. FIG. 6 shows only one side of an egg holder, the construction being repeated in mirror image on the other end. The pins 70 extend into a single link 69 which is attached to the side of the chain 9, there being one link (properly spaced), for each egg holder. The egg holders have rigidly mounted thereon sleeves 72 through which the shaft carrying the rollers 13 pass. These sleeves also carry sprockets 73.

When the shaking has ceased and the track sections 60 are aligned with the stationary portions of the track 9 the egg holder proceeds to Station 10. As it moves, the sprockets 73 contact a rigidly mounted stationary section 74 of chain on each portion of the track front and back. This causes the sprockets 73 to rotate as shown by the circular arrows in FIG. 1B, resulting in rotating the egg holders through a complete circle, thus breaking any vacuum. FIG. 9 illustrates the position at a quarter rotation between Stations 9 and 10. The rotational force is sufficient so that the spring pressed balls 89 are pushed back and do not lock again until the egg holder is perfectly vertical.

At Station 10 the mechanism for shaking described at Station 9, is repeated, there being a second set of movable tracks 60, and shaking takes place in the same manner as described in connection with Station 9 and with FIGURE 8. The shafts for Stations 10 and 11, which carry the shaking cams, are driven from a sprocket 75 on shaft 65 at the Station 9 through a chain 76 which appears on FIG. 9 but not on FIG. 8. The shaft for Station 10 appears in FIG. 9 and carries a second sprocket 77 which through another chain (not shown), drives the corresponding shaft for Station 11. In other words, the shaker plates for all three stations are driven by a single motor which drives shaft 65 of Station 9. The shaker plates 61 for all of the stations are guided for vertical motion by guide blocks 78.

The egg holder moves on, again being turned 360° by a second chain section between Stations 10 and 11, which is the same as between Stations 9 and 10 and bears the same reference numeral. This operation is seen both on FIGS. 1A and 1B which join at this point. Finally, at Station 11 the shaking proceeds in the same manner as has been described above.

The egg holders then move on the permanent track 9 through Station 12 on FIG. 1A and finally encounter a cam 80 which performs the same function as the cam 86 in FIG. 10, which has been described in conjunction with Stations 2 to 5 above. The locking plate is moved to the right, the cups 18 are unlocked.

The egg holders now move on to Station 13 and at this point a cam or track 81 engages the top groove 99 on the cup 18. This permits the funnels 25 to be tilted and at the same time the cylinder 90 moves a rack 91 contacting a gear 93 which turns an arm 94 and a pin 92; this latter strikes the egg in the funnel, tips it out, and it falls into a waste egg container 82. Further motion of the drive chain at its next intermittent movement brings the egg holder to Station 1 and the sequence of operations is repeated.

The above description completes the cycle when eggs are being harvested. During an eight hour day it is customary to have a morning and afternoon break and, of course, a break for lunch. At these times the container 59 is removed and the fluid transferred to suitable shipping containers. The container 59 is washed with disinfectant and a disinfecting cycle is initiated as follows, having reference to FIGS. 1A and 2. A pin 96 is engaged in an opening in the lever 43 so that when the latter is raised by the cylinder 44, an arm 102 is pulled up which actuates a lever 103 and raises a tank of disinfectant 101 until it touches the funnel spouts. Of course this raising occurs only when the cylinder 44 is actuated. Now the machine is started up again, but with no eggs in it, and run through a full cycle. As each funnel comes opposite Station 12, the tank 101 is raised, as has been described above, and bathes the end of the funnel and spout with disinfectant. In FIG. 1A the tank 101 is shown in full lines in its lowered position and in dashed lines in its raised position. After the disinfecting cycle has been completed, the pin 96 is disengaged from the lever 43 and the machine is now ready for harvesting eggs through its normal harvesting cycle as has been described above.

The use of a container 59 to collect the harvested liquid has been described and is a simple, albeit batch, modification. An alternative method which continuously removes harvested fluid is also possible in FIGS. 1A and 1B (106) and under the lowered portions of the trough 58 underneath each of the Stations 8 to 12. These nipples can be connected to a manifold 107 and lead to a pump (not shown). The showing of the manifold is purely diagrammatic as its exact construction forms no part of the present invention.

We claim:

1. An automatic machine for recovering fluid from parts of embryonated eggs comprising in combination,
   (a) a plurality of egg holders,
   (b) means for moving said holders successively to successive stations around an endless path,
   (c) the egg holders being mounted in housings and resilient funnel members swingable on said housing by parallel bars from a position to one side of the egg holders to a position over the eggs in the holder, the number of funnels being equal to the number of eggs,
   (d) means for swinging the funnels to one side at a loading station and means for permitting loading of eggs vertically into the holder with the pointed ends down,
   (e) means for raising the egg holder at a second station and means for decapitating the rounded end of the egg at said station and removing the decapitated shell,
   (f) means for lowering the egg holder as it proceeds to a further station,
   (g) means for exposing the decapitated eggs to manual puncturing of membranes,
   (h) means for swinging up the funnels as the egg holder reaches a succeeding station and means at said station for raising the egg holder to bring the funnels in contact with the decapitated egg ends,
   (i) means for locking the egg holder in the raised position,
   (j) collecting means for fluid and means for inverting the egg holders in their locked raised position to drain liquid into the collector,
   (k) means at a succeeding station for vertically shaking the egg container to shake out further liquid,
   (l) means as the egg holder is advanced to succeeding stations for repeating the following sequence of operations at least once, the sequence involving rotation of the egg holder through 360° whereby vacuum in the egg is broken and again shaking the egg vertically after rotation through the 360°,
   (m) means actuated by the movement of the egg holder to succeeding stations to unlock the egg holder raising means to turn the egg holder and permit eggs to fall therefrom, and
   (n) means actuated by further movement of the egg holder to turn it into an upright position and bring it to the first station.

2. A machine according to claim 1 in which means are provided for maintaining substantially sterile conditions in the apparatus.

3. A machine according to claim 2 in which the path is a vertical oval and the means for inverting the egg holders to drain into the fluid collector and for restoring to the upright position at Station 1 are the two curved ends of the vertical oval.

4. A machine according to claim 3 in which the egg holders are mounted on shafts upwardly movable under spring pressure in a housing and the locking means comprises latching means connecting the housing to the shaft.

5. A machine according to claim 4 in which the egg holders are movable in a framework provided with guide wheels and the vertical oval path is defined by guide rails between which the wheels run.

6. A machine according to claim 2 in which the means for swinging the funnels into the two positions are stationary cam means.

7. A machine according to claim 3 in which the egg holders are movable in a framework against spring and shaking is effected by a cam bearing on egg holder shafts.

8. A machine according to claim 3 in which the means for rotating the egg holders through 360° comprise a stationary rack and a pinion on the egg holder housing.

9. A process of harvesting biologicals from embryonated eggs which comprises, in combination
   (a) chilling the eggs and disinfecting their surfaces,
   (b) loading the eggs onto egg container with blunt or rounded ends up,
   (c) decapitating the blunt ends of the egg shells,
   (d) puncturing egg membranes,
   (e) sealing the decapitated and punctured ends of the eggs into funnels,
   (f) inverting the eggs and collecting liquid material flowing out of the funnels,
   (g) shaking the eggs in inverted position,
   (h) rotating the eggs through 360° to break vacuum and again shaking, the shaking and rotating through 360° being carried out at least once.
   (i) collecting drained fluids,
   (j) unsealing the decapitated ends of the eggs from the funnels and discarding the shells, all of the operations from (b), to (j) being effected without contaminating the liquids recovered with unwanted micro-organisms.

10. A process according to claim 9 in which the operations (b) to (j) are effected in an atmosphere and in the presence of sterilizing radiation.

11. A process according to claim 10 in which the recovered material from the eggs is at least one of the following: amniotic fluid or chlorioallantoic fluid, and the embryonated eggs before chilling have been inoculated with virus to produce a vaccine and incubated until a predetermined amount of vaccine is produced.

References Cited

UNITED STATES PATENTS 3,147,783   9/1964   Noltes _____ 146—2

OTHER REFERENCES

Beveridge et al: The Cultivation of Viruses and Rickettsiae in the Chick Embryo, Medical Research Council Special Report Series No. 256, published in London by His Majesty's Stationary Office, 1946, pp. 11 to 22.

ALVIN E. TANENHOLTZ, Primary Examiner.

U.S. Cl. X.R.

195—104, 1.3, 127; 146—2, 221